United States Patent [19]
Lee

[11] Patent Number: 6,055,119
[45] Date of Patent: Apr. 25, 2000

[54] ADAPTIVE SIGNAL PROCESSING METHOD AND CIRCUIT FOR A DIGITAL RECORDING/REPRODUCING APPARATUS

[75] Inventor: Myeong-hwan Lee, Suwon, Rep. of Korea

[73] Assignee: Samsung Electronics Co., Ltd., Kyungki-do, Rep. of Korea

[21] Appl. No.: 09/027,252

[22] Filed: Feb. 20, 1998

[30] Foreign Application Priority Data

Feb. 21, 1997 [KR] Rep. of Korea .......................... 97-5254

[51] Int. Cl.[7] .............................. G11B 5/09; G11B 5/035
[52] U.S. Cl. ................................. 360/51; 360/65
[58] Field of Search ................................ 360/51, 65, 27, 360/32; 386/40, 88, 90, 124

[56] References Cited

FOREIGN PATENT DOCUMENTS 0 762 423   3/1997   European Pat. Off. .

OTHER PUBLICATIONS

Gardner, Floyd M., "Interpolation in Digital Modems—Part 1: Fundamentals", IEEE Transactions on Communications, vol. 41, No. 3, Mar. 1993, pp. 501–507.

*Primary Examiner*—W. Chris Kim
*Attorney, Agent, or Firm*—Sughrue, Mion, Zinn Macpeak & Seas, PLLC

[57] ABSTRACT

A method and circuit in a digital recording/reproducing apparatus are provided for adaptively processing symbol timing recovery and equalization for an input signal including known signal sequence. The adaptive signal processing method includes the steps of sampling the input signal according to a sampling clock and outputting sampled data, detecting whether the sampled data is a known signal sequence and detecting a track mode from the detected known signal sequence according to a predetermined track pattern. The sampled data is equalized according to a predetermined equalization coefficient to generate equalized data. The equalization coefficient is renewed using an error between a prestored reference signal according to the track pattern and the equalized data. Next, the sampling clock for compensating for the error is generated during the remaining known signal sequence period directly after the track mode is detected, the equalization coefficient is renewed using an error between determined data and the equalized data, and the sampling clock is generated for compensating for the error during a period except the known signal sequence period. Therefore, adaptive signal processing such as timing recovery or equalization is performed using the known signal sequence like an ITI sector, thereby improving the performance of the digital recording/reproducing apparatus.

22 Claims, 5 Drawing Sheets

ADAPTIVE SIGNAL PROCESSING METHOD AND CIRCUIT FOR A DIGITAL RECORDING/REPRODUCING APPARATUS

BACKGROUND OF THE INVENTION

1. Field of the Invention

The present invention relates to a method and circuit for adaptively processing signals in a digital recording/reproducing apparatus, and more particularly, to a method and circuit for adaptively processing symbol timing recovery and equalization using known signal sequence.

2. Description of the Related Art

In accordance with the development of digital technologies, most conventional analog processing has been replaced by digital signal processing which is stable and widely applicable. Televisions are considerably dependent upon the digital signal processing technology in many aspects and many integrated circuits (ICS) implementing using digital signal processing technology are implemented therein. Like the televisions, video cassette recorders (VCRs) are being digitized and the signal format thereof is digitized but the signal processing thereof is digitized in only limited aspects due to system characteristics of a VCR. In other words, since there are factors varying by interaction between mechanical parts for storing signals onto and reproducing signals from a tape, most signal processing is implemented in an analog format. Since the data used in such a digital VCR is binary data, the digital VCR can be considered a communication system in which signal processing is relatively simplified.

To optimize the sampling timing of an input signal and compensate for variation in frequencies between oscillators of a transmitter and a receiver, the frequencies and phases of clocks of the receiver must be continuously adjusted. Furthermore, timing in a receiver, like that of a digital VCR, must be synchronized to symbols of input data. This is called symbol timing recovery.

For the symbol timing recovery, an open-loop signal processing method and a closed-loop signal processing method can be used. In general, since the performance of a closed-loop structure is better than that of an open-loop structure, the closed-loop structure is mostly used. To obtain a timing phase error, a band edge component maximization (BECM) algorithm using an N-times over-sampling technique is typically used and is disclosed in an article (1) entitled "Passband Timing Recovery in an All-Digital Modem Receiver," D. N. Godard, IEEE Trans. on Communications, vol. COM-26, No. 5, pp. 517–523, May 1978. As another typically used method for obtaining a timing phase error, there has been proposed a Mueller & Müller (to be referred to as "MM" hereinafter) algorithm using symbol timing recovery and symbol rate sampling, which is disclosed in an article (2) entitled "Timing Recovery in Digital Synchronous Data Receivers," K. H. Mueller and M. Müller, IEEE Trans. on Communications, vol. COM-24, No. 5, pp 516–531, May 1976.

FIGS. 1 through 3 show block diagrams of systems implementing methods of possible symbol timing recovery loops. Here, the most simply implemented system is shown FIG. 1, in which a timing detector 12 precedes an equalizer 13, as disclosed in the above-described article (1). In FIG. 1, an analog-to-digital (A/D) converter 11 samples an input signal according to a sampling clock and applies the sampled data to the timing detector 12 and equalizer 13. The timing detector 12 detects a timing phase error from the sampled data and supplies the sampling clock for compensating for the phase error to the A/D converter 11. The equalizer 13 equalizes the sampled data. Therefore, the timing detector 12 shown in FIG. 1 is not affected by the equalizer 13. This is an over-sampling method in which the sampling clock requires an N-times symbol frequency.

FIG. 2 shows a structure in which an equalizer precedes a timing detector, as disclosed in the above-described article (2). In FIG. 2, an analog-to-digital (A/D) converter 21 samples an input signal according to a sampling clock and an equalizer 22 equalized the sampled data output from the A/D converter 21. The timing detector 23 detects a timing phase error from the equalized data output from the equalizer 22 and applies the sampling clock for compensating for the phase error to the A/D converter 21. Thus, the equalizer 22 shown in FIG. 2 is a fractionally spaced equalizer. Therefore, even if symbol timing recovery is not completely performed, the equalizer 22 serves as an interpolator for performing timing error detection from an inter-symbol interference (ISI) eliminated signal output from the equalizer 22, thereby reducing timing jitter. However, in this case, signal processing speed must be increased. Also, in the case of a serious noise, the equalizer 22 may not operate properly due to misconvergence caused by an initial timing error.

According to the systems shown in FIGS. 1 and 2, the hardware becomes complex since a timing phase error signal detected by a voltage controlled oscillator (VCO) built in the timing detectors 12 and 23 must be supplied for detecting sampling positions of the A/D converters. To overcome such a drawback, a system shown in FIG. 3 is used to implement a perfect digital receiver, which is disclosed In an article (3) entitled "Interpolation in Digital Modems—Part I: Fundamentals," Floyd M. Gardner, IEEE Trans. on Communications, vol. COM-41, No. 3, pp. 501–507, March 1993.

In FIG. 3, an analog-to-digital (A/D) converter 31 samples an input signal using the clock of a fixed oscillating frequency generated from a fixed VCO 32 as a sampling clock. An interpolator 33 interpolates the sampled data output from the A/D converter 31 and applies the interpolated data to a timing detector 34 and an equalizer 36. A timing detector 34 detects a timing phase error from the interpolated data. A controller 35 generates a clock for the interpolation of the interpolator 33 for the purpose of controlling the phases of the sampled data. The equalizer 36 equalizes the interpolated data.

According to the system shown in FIG. 3, A/D conversion is performed with a fixed clock and sampling is performed by adjusting the phases of the interpolator 33, thereby generating a symbol timing recovered signal. Although the method implemented in the system shown in FIG. 3 also requires an over-sampling technique, the sampling frequency can be easily implemented by performing A/D conversion at a sampling rate slightly higher than that of a symbol clock frequency.

A DVCR requires a fast signal processing of a symbol rate higher than or equal to 40 MHZ. Thus, it is quite difficult to apply the symbol timing recovery method using the over-sampling technique practically to the DVCR. Even if it is possibly applied thereto, the product becomes expensive. However, for fast system initialization, the DVCR initially transmits to the respective tracks prescribed symbols, which can be used as training sequence. Thus, since the MM algorithm operates optimally when training sequences are given, it is advantageous to adopt the MM algorithm for symbol timing recovery.

Also, an equalizer for a DVCR operates mainly for correcting the waveform of pulses, rather than for eliminating multipath noise. The equalizer for a DVCR has a relatively shorter filter tap length (about 5 taps) and higher sampling frequency (about 40 MHZ), compared to an equalizer used for terrestrial broadcasting in a conventional television. Thus, since it is difficult to accomplish fractional equalizing structures necessitating over sampling, there has been an increasing demand for an adaptive equalizer.

SUMMARY OF THE INVENTION

To solve the above problems, it is an objective of the present invention to provide a method for adaptively processing symbol timing recovery and equalization using known signal sequence in starting parts of the respective tracks.

It is another objective of the present invention to provide a circuit for adaptively processing symbol timing recovery and equalization using known signal sequence in starting parts of the respective tracks.

Accordingly, to achieve the above objective, there is provided an adaptive signal processing method comprising the steps of: sampling the input signal according to a sampling clock and outputting sampled data; detecting whether the sampled data is the known signal sequence and detecting a track mode from the detected known signal sequence according to a predetermined track pattern; equalizing the sampled data according to a predetermined equalization coefficient and outputting equalized data; determining the equalized data and outputting determined data; and renewing the equalization coefficient using an error between a prestored reference signal according to the track pattern and the equalized data, generating the sampling clock for compensating for the error during the remaining known signal sequence period directly after the track mode is detected, renewing the equalization coefficient using an error between the determined data and the equalized data, and generating the sampling clock for compensating for the error during a period except the known signal sequence period.

To achieve another objective, there is provided an adaptive signal processing circuit comprising: an analog-to-digital (A/D) converter for sampling the input signal according to a sampling clock and outputting sampled data; an equalizer for equalizing the sampled data according to a predetermined equalization coefficient and outputting equalized data; a determiner for determining the equalized data and outputting the determined data; a first detector for detecting whether the sampled data is the known signal sequence, detecting a track mode from the detected known signal sequence according to a predetermined track pattern, and outputting a selection signal and an enable signal enabled directly after the track is detected, to the equalizer; a generator for generating a reference signal according to the detected track pattern; a second detector for detecting the reference signal during the remaining known signal sequence period directly after the track mode is detected according to the selection signal, selecting the determined data during a period except the known signal sequence period, and detecting an error between the selection signal and the equalized data; and a timing detector enabled by the enable signal for generating the sampling clock for compensating for the error, wherein the equalizer renews the equalization coefficient using the error.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENTS

Hereinbelow, an adaptive signal processing method for a digital recording/reproducing apparatus according to the present invention and a circuit thereof will be described with reference to accompanying drawings.

Figure 2:
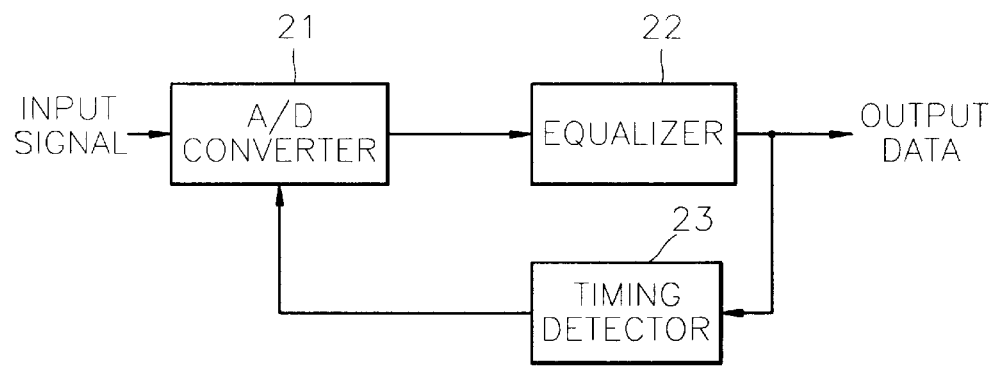
FIG. 2 is a block diagram illustrating implementation of a method in which a general equalization precedes symbol timing recovery.
Figure 4:
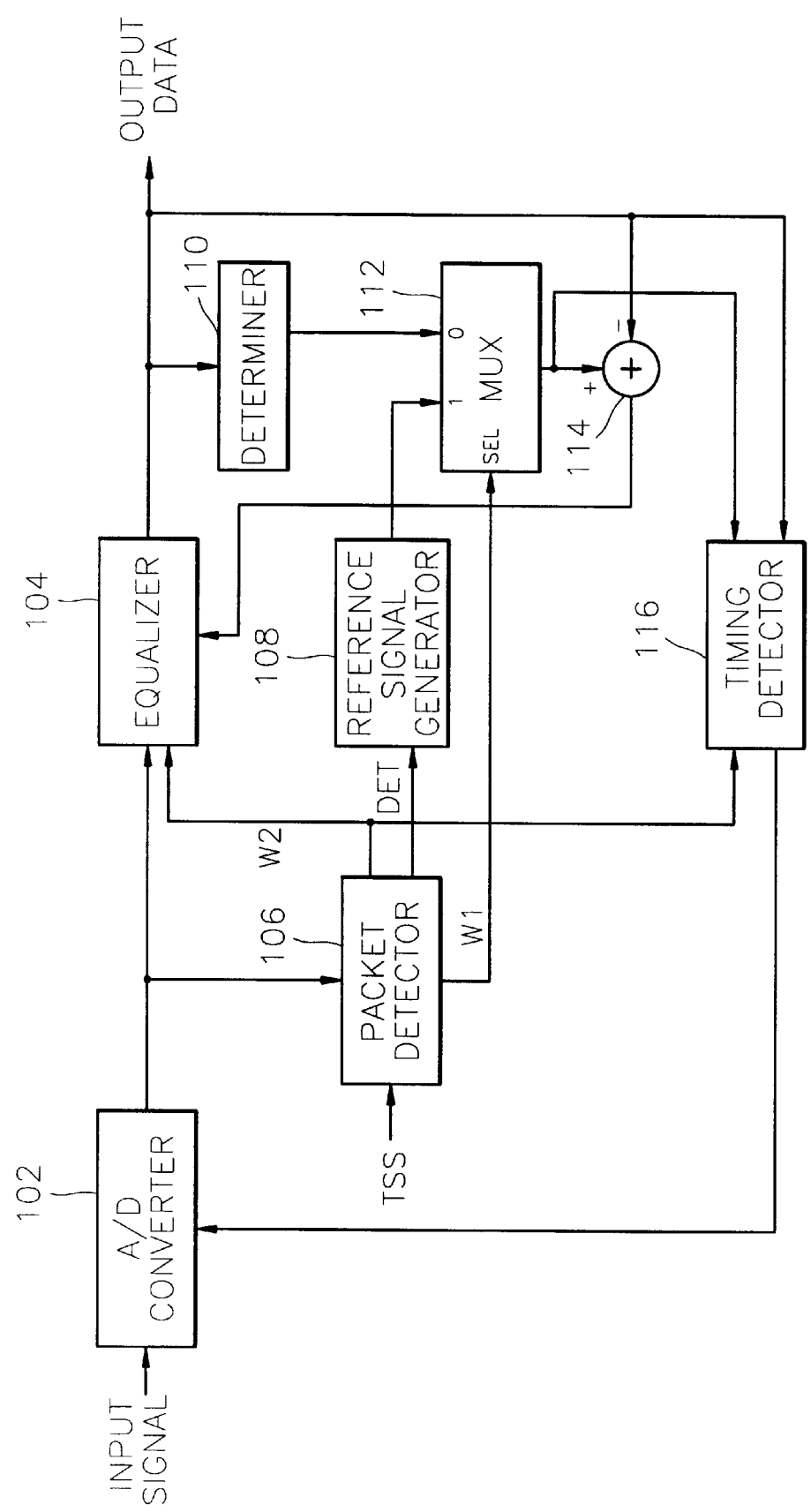
FIG. 4 is a block diagram illustrating an adaptive signal processing circuit of a digital recording/reproducing apparatus according to a first embodiment of the present invention.

FIG. 4 is a block diagram illustrating an adaptive signal processing circuit of a digital recording/reproducing apparatus according to a first embodiment of the present invention, which is applicable to the structure shown in FIG. 2. In FIG. 4, a signal read out by a head (not shown) is sampled into digital data by an A/D converter 102 and symbol timing is recovered through an equalizer 104.

Figure 5A:
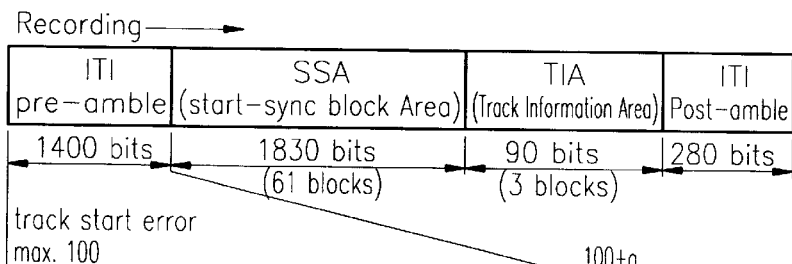
FIGS. 5A through 5H are timing diagrams illustrating the circuit shown in FIG. 4.

Here, the format of the signal read out by the head of a DVCR will be described briefly. Each track of the signal is composed of an insert and track information (ITI) sector, an audio sector, a video sector, and a sub-code sector, from the starting part at which the head starts scanning. As shown in FIG. 5A, the ITI sector of each track includes a pre-amble area of 1400 bits, a start-sync block area (SSA) of 1830 bits, a track information area (TIA) of 90 bits, and a post-amble area of 280 bits. Here, the data of the pre-amble, TIA and post-amble areas are known data by track patterns F0, F1 and F2, and the data of the SSA is composed of three predetermined sync patterns of 10 bits for the respective track patterns.

Also, in the case of a DVCR, if the head deviates from the track of a magnetic recording medium during reproduction, since the output of the head decreases and errors increase, it is difficult to attain normal reproduction of the DVCR. Thus, different pilot signals are written onto continuous tracks in the pattern order of F0 to F1 to F0 to F2, for example. The crosstalk of the pilot signals of tracks coming before and after the track which is traced most closely by the head, are compared with each other, to then detect whether head tracking deviates to the preceding track or succeeding track, thereby controlling the head to trace a target track correctly.

Figure 5B:
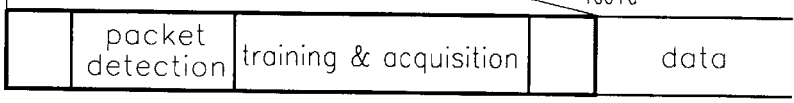
Figure 5C:

A packet detector 106 detects ITI pre-amble data (FIG. 5B) of the ITI sector (FIG. 5A), output from the A/D converter 102, according to a track start signal (TSS) (FIG. 5C) generated from a servo, representing the starting point of a track, to detect a track mode.

As described above, known signal sequences are present on the pre-amble area and post-amble area for the respective sectors of the track. Although all of these signal sequences can be utilized, since the DVCR signal processing is initiated again in units of tracks, the data of the ITI sector is used in the present invention. Initial operation is performed using the ITI pre-amble data from the data of the ITI sector. In other words, the signal used for the equalization and timing recovery of the present invention is the ITI pre-amble data. However, even with the exception of the signal, since the other signals are binary data, subsequent signal processing is possible by using decision.

Figure 5D:
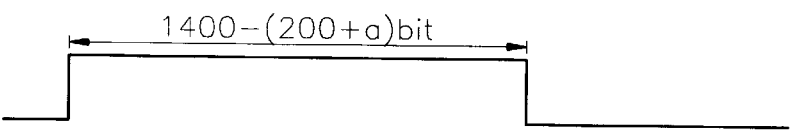

To utilize a known signal, the position of the signal must be searched correctly. Since a VCR mechanically operates using a tape as a storage medium, the starting point of a track may be deviated. Thus, the position of a signal to be used must be first searched. To this end, the TSS related to the starting of a track, generated from the servo unit, is used. In other words, the packet detector 106 detects a track mode, with bits corresponding to the maximum error tolerance of the pre-amble data being ignored, based on the TSS shown in FIG. 5C, using subsequent pre-amble data. Here, the known data can be partially used with the exception of a predetermined part out of the entire length, due to the range of errors of the TSS. Since the TSS may precede the actual track, the usable data of the ITI pre-amble area are 1400-(200+a) bits when the maximum error tolerance of the TSS is 100 bits, as shown in FIG. 5D. Here, reference character 'a' is a margin for stable operation.

Figure 5E:
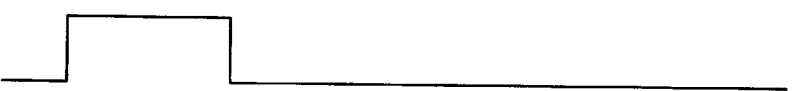

The track mode represents which track pattern F0, F1 or F2 the current track is on. Each of the three track patterns has a predetermined signal in the pre-amble area. Therefore, the packet detector 106 stores the predetermined signal as a reference signal and detects the track mode by checking or comparing correlation between the input signal and the reference signal. The track mode is sequenced in a predetermined order of F0 to F1 to F0 to F2, for example. Thus, after the track mode is detected during an initial operation, the reference signal having the track patterns of the predetermined order can be used. As shown in FIG. 5E, during a predetermined period of the pre-amble area, if the track mode is determined, the signal reproduced by the head can be adaptively equalized using the reference signal of the remaining pre-amble area, or timing error detection can be performed, which will now be described.

Figure 5F:
Figure 5G:
Figure 5H:

If the track mode is detected in the packet detector 106, a track mode detection signal DET is applied to a reference signal generator 108 at a timing point shown in FIG. 5F and simultaneously a selection signal W1 shown in FIG. 5G is applied to a multiplexer (MUX) 112. Also, an enable signal W2 shown in FIG. 5H is applied to an equalizer 104 and a timing detector 116. Here, the selection signal W1 shown in FIG. 5G is a signal indicative of logic "high" from the timing of the end point of the track mode detection period shown in FIG. 5D to the timing of the end point of the ITI pre-amble area. The enable signal W2 shown in FIG. 5H is a signal indicative of logic "high" directly after the timing of the track mode detection period shown in FIG. 5D.

The reference signal generator 108 generates reference signals of the corresponding track patterns according to the track mode detection signal DET to then apply the same to a first input port 1 of the multiplexer 112. The reference signals of the ITI pre-amble area are pre-stored in the reference signal generator 108 by the respective track patterns. The multiplexer 112 selects a reference signal sequence generated from the reference signal generator 108 and applied to the first input port 1, according to the selection signal W1 of logic "high" shown in FIG. 5G. A subtractor 114 subtracts the equalized signal sequence output from the equalizer 104 from the reference signal sequence selected from the multiplexer 112, and a filter coefficient of the equalizer 104 is renewed using the subtraction result. The timing detector 116 obtains an error between the reference signal sequence selected from the multiplexer 112 and the data output from the equalizer 104 to then apply the sampling frequency for compensating for the error to the A/D converter 102.

If the packet detector 106 applies the selection signal of logic "low" indicative of the end of the known signal sequence (the pre-amble area of the ITI sector) to the multiplexer 112, the multiplexer 112 selects the output of a determiner 110, applied to a second input port 0. The subtractor 114 subtracts the output of the equalizer 104 from the output of the determiner 110. The determination error which is the subtraction result is continuously used in the equalizer 104. The timing detector 116 applies the sampling clock for compensating for an error between the output of the determiner 110, selected by the multiplexer 112 and the output of the equalizer 104, i.e., the determination error, to the A/D converter 102.

Even if the selection of the track modes is performed by the packet detector 106 only during an initial operation, the track modes can be determined in a predetermined track pattern order because the sequence of the tracks is already determined. In general, to operate the equalizer 104, an LMS (Least Mean Square) algorithm is chiefly used for known signal sequence, and a DD (Decision Directed) algorithm is chiefly used for random signal sequence. The most widely used algorithm is the LMS algorithm, which is dependent upon the basis of convergence which minimizes a mean square error (MSE).

Also, the timing detector 116 takes the MM algorithm linked with the DD algorithm for the equalizer 104 into consideration, for compensating for the above-described channel characteristics. In other words, since the equalizer 104 is disposed in the timing error loop, the operation related to the timing error is necessary.

In other words, the MM algorithm used for symbol timing recovery takes the DD method, as disclosed in the above-mentioned article (2), is suitable for reception of a carrier-suppressed base band signal and exerts good performance with respect to binary amplitude signals. In case when channel distortion is correctly known or a change in channel characteristics depending on time is not fast, good performance can be exerted. Also, in the MM algorithm, channel impulse response which is based on raised cosine spectrum pulses is assumed, and a type A using the symmetry of the raised cosine spectrum pulses is mainly used. The feature of the type A is in that the smaller the Nyquist pulse value a having various roll-offs, the greater the slope of a timing function, which means that a trace jitter value is reduced. Also, since the MM algorithm takes the DD method, it is difficult to attain carrier recovery and linkage, which does not, however, matter since the carrier recovery is not necessary in the DVCR. Also, according to the DD method, the trace performance is degraded at a low signal-to-noise ratio (SNR). To solve this problem, in the present invention, fast convergence is realized using the known data (ITI pre-amble data) at an initial stage.

Figure 1:
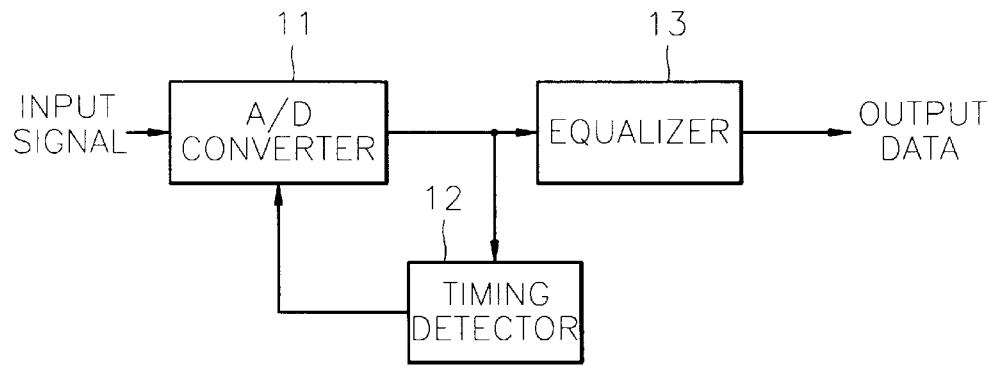
FIG. 1 is a block diagram illustrating implementation of a method in which general symbol timing recovery precedes equalization.
Figure 6:
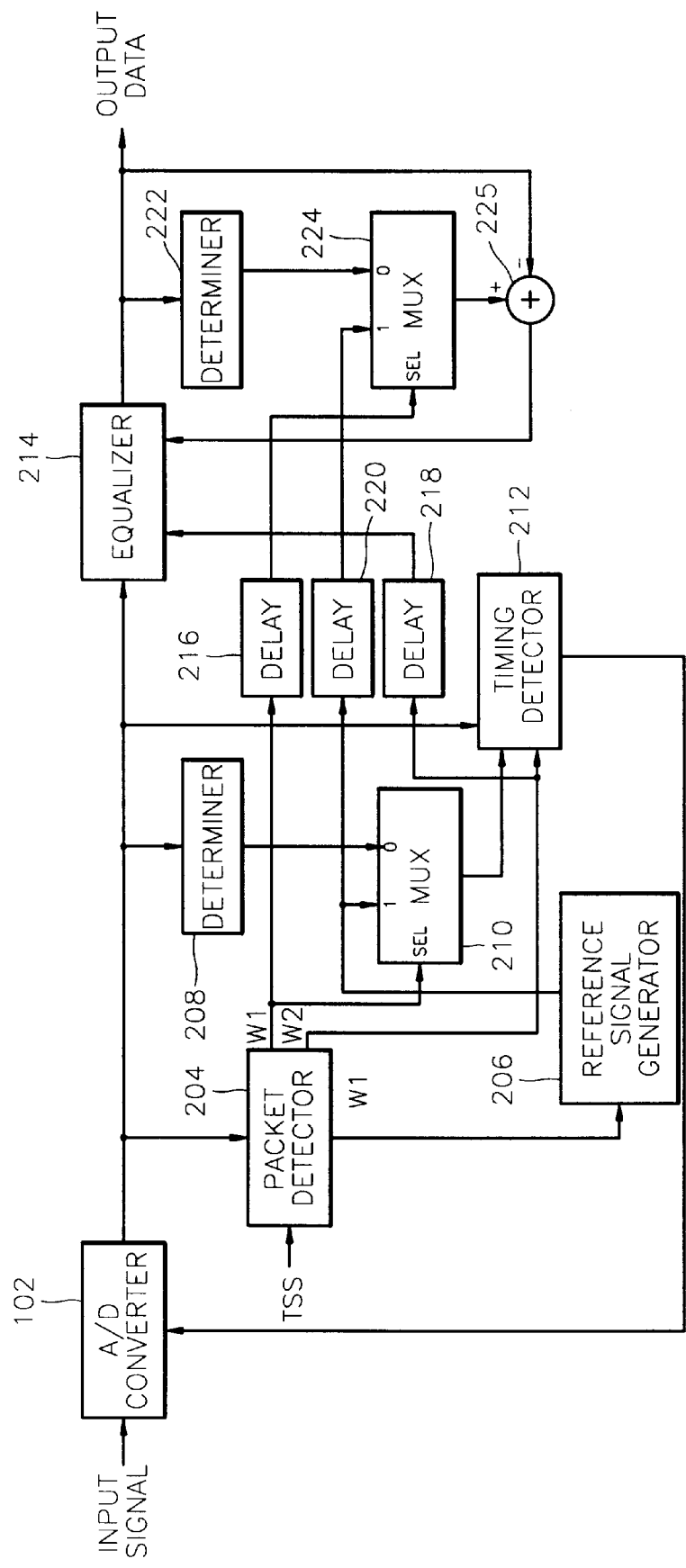
FIG. 6 is a block diagram illustrating an adaptive signal processing circuit of a digital recording/reproducing apparatus according to a second embodiment of the present invention.

FIG. 6 is a circuit diagram illustrating an adaptive signal processing circuit of a digital recording/reproducing apparatus according to a second embodiment of the present invention, which is also applicable to the structure shown in FIG. 1.

In FIG. 6, an analog-to-digital (A/D) converter 202 samples a signal reproduced by the head and applies the same to a determiner 208 and an equalizer 214. A packet detector 204 reflects the maximum error of the ITI pre-amble data using a track start signal TSS indicative of the start of a track, generated from a servo unit, detects a track mode using the ITI pre-amble data which is in known signal sequence according to the respective track patterns, applies a track mode detection signal DET to a reference signal generator 206, applies the selection signal W1 shown in FIG. 5G to a selection port SEL of a multiplexer 210 for symbol timing recovery and equalization during the remaining ITI pre-amble data period directly after the track mode is detected, and applies the enable signal W2 shown in FIG. 5H continuously having a logic "high" period directly after the track mode is detected, to a timing detector 212.

The reference signal generator 206 generates reference signal sequence corresponding to the track patterns according to the track mode detection signal DET to then apply the same to a first input port 1 of the multiplexer 210. The multiplexer 210 selects a reference signal sequence generated from the reference signal generator 206 during the pre-amble data period according to the selection signal W1, and selects the data determined from the determiner 208, applied to a second input port 0 during the other data periods to then output the selected data to the timing detector 212. The timing detector 212 to which the MM algorithm is adopted detects an error between the selected data and the sampled data output from the A/D converter 202 to then apply the sampling clock for compensating for the error to the A/D converter 202.

A delay 216 delays the selection signal W1 generated from the packet detector 204 by the number of center taps of the equalizer 214 and applies the is delayed signal to a selection port SEL of the multiplexer 224. A delay 218 delays the enable signal W2 generated from the packet detector 204 by the number of center taps of the equalizer 214 and applies the delayed signal to the equalizer 214. A delay 220 delays the reference signal sequence generated from the reference signal generator 206 by the number of center taps of the equalizer 214 and applies the delayed signal to the first input port 1 of the multiplexer 224. Here, if the equalizer 214 is a filter having N taps, the center taps thereof is N/2.

The equalizer 214 is enabled by the enable signal W2 delayed by the delay 218. The determiner 222 determines the output of the equalizer 214 and applies the determined data to the second input port 0 of the multiplexer 224. The multiplexer 224 selects the reference signal sequence delayed by the delay 220 according to the selection signal W1 delayed by the delay 216 or selects the data determined from the determiner 222 and applies the selected signal to a subtractor 225. The subtractor 225 renews a filter coefficient of the equalizer 214 using an error signal between the selected signal and the output signal of the equalizer 214.

Figure 3:
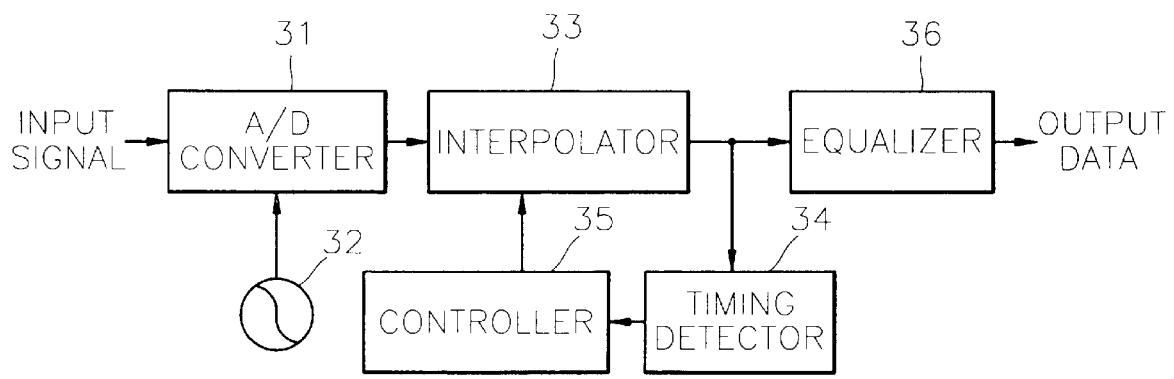
FIG. 3 is a block diagram illustrating implementation of another method in which general symbol timing recovery precedes equalization.
Figure 7:
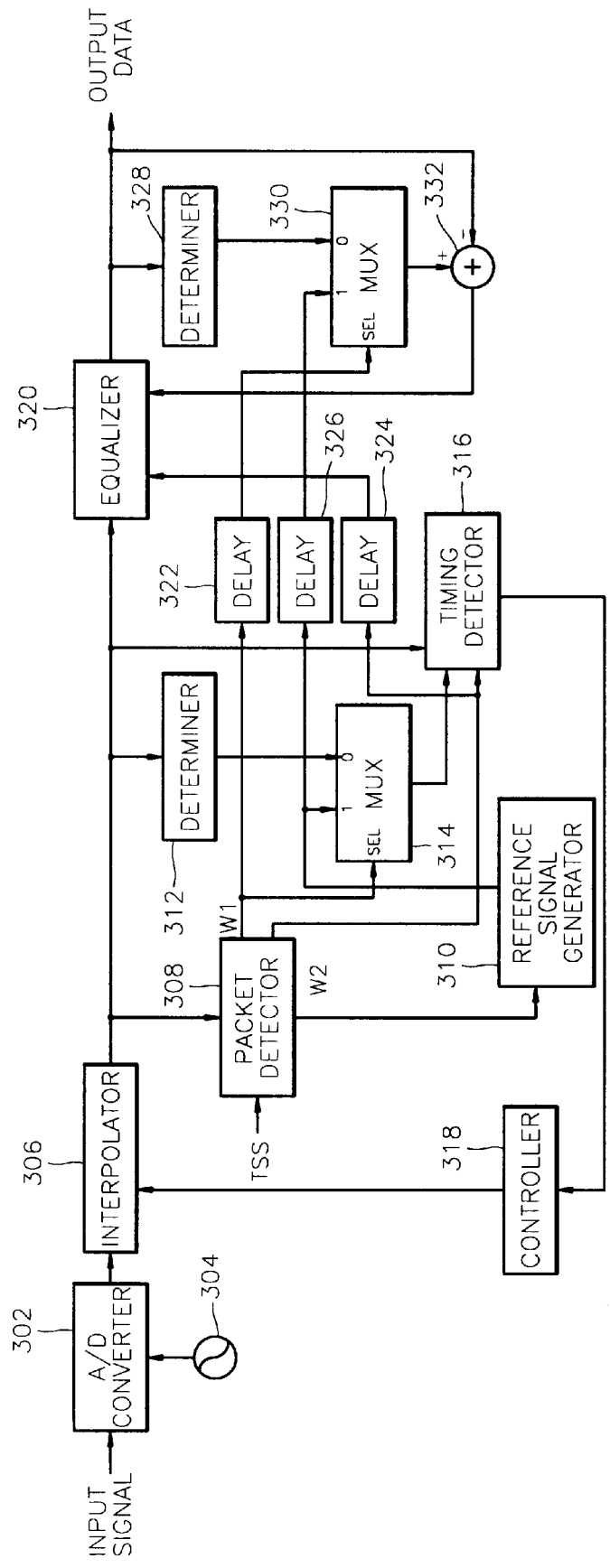
FIG. 7 is a block diagram illustrating an adaptive signal processing circuit of a digital recording/reproducing apparatus according to a third embodiment of the present invention.

FIG. 7 is a circuit diagram illustrating an adaptive signal processing circuit of a digital recording/reproducing apparatus according to a third embodiment of the present invention, which is also applicable to the structure shown in FIG. 3.

In FIG. 7, an analog-to-digital (A/D) converter 302 samples an input signal reproduced by the head according to the sampling clock of a fixed frequency generated from an oscillator 304. An interpolator 306 interpolates the sampled data output form the A/D converter 302 and output the interpolated data to a packet detector 308, a determiner 312, a timing detector 316 and an equalizer 320.

The packet detector 308 reflects the maximum error of the pre-amble data using a track start signal TSS indicative of the start of a track, generated from a servo unit, detects a track mode using the pre-amble data which is in known signal sequence according to the respective track patterns, applies a track mode detection signal DET to a reference signal generator 310, applies the selection signal W1 shown in FIG. 5G to a selection port SEL of a multiplexer 314 for symbol timing recovery and equalization during the remaining pre-amble data period directly after the track mode is detected, and applies the enable signal W2 shown in FIG. 5H continuously having a logic "high" period directly after the track mode is detected, to a timing detector 316.

The reference signal generator 310 generates reference signal sequence corresponding to the track patterns according to the track mode detection signal DET to then apply the same to a first input port 1 of the multiplexer 314. The multiplexer 314 selects a reference signal sequence generated from the reference signal generator 310 during the pre-amble data period according to the selection signal W1, and selects the data determined from the determiner 312, applied to a second input port 0 during the other data periods to then output the selected data to the timing detector 316. The timing detector 316 to which the MM algorithm is adopted detects an error between the interpolated data and the selected data output from the multiplexer 314 to then apply the phase-corrected interpolating clock for compensating for the error to a controller 318.

A delay 322 delays the selection signal W1 generated from the packet detector 308 by the number of center taps of the equalizer 320 and applies the delayed signal to a selection port SEL of the multiplexer 330. A delay 324 delays the enable signal W2 generated from the packet detector 308 by the number of center taps of the equalizer 320 and applies the delayed signal to the equalizer 320. A delay 326 delays the reference signal sequence generated from the reference signal generator 310 by the number of center taps of the equalizer 320 and applies the delayed signal to the first input port 1 of the multiplexer 330. The equalizer 320 is enabled by the enable signal W2 delayed by the delay 324. The determiner 328 determines the output of the equalizer 320 and applies the determined data to the second input port 0 of the multiplexer 330. The multiplexer 330 selects the reference signal sequence delayed by the delay 324 according to the selection signal W1 delayed by the delay 322 or selects the data determined from the determiner 328 and applies the selected signal to a subtractor 332. The subtractor 332 renews a filter coefficient of the equalizer 320 using an error signal between the selected signal and the output signal of the equalizer 320.

The present invention can be applied to storage media or communication media having signal formats having known signal sequence.

According to the present invention, adaptive signal processing is performed on an ITI sector in a DVCR using known signal sequence, the maximum error of the known signal sequence is considered using a TSS signal so as to allow such adaptive signal processing, and training sequence suitable for the respective tracks are selected by detecting the respective tracks using their correlation, improving the performance of the DVCR.

What is claimed is:

1. A method for adaptively processing symbol timing recovery and equalization for an input signal including known signal sequence, the method comprising the steps of:

(a) sampling an input signal according to a sampling clock to generate sampled data;

(b) detecting whether the sampled data is a known signal sequence and detecting a track mode from the known signal sequence according to a predetermined track pattern;

(c) equalizing the sampled data according to a predetermined equalization coefficient to generate equalized data;

(d) determining a level value of the equalized data and outputting determined data; and (e) renewing the equalization coefficient using an error between a prestored reference signal according to the track pattern and the equalized data, generating the sampling clock for compensating for the error during a remaining known signal sequence period directly after the track mode is detected in the step (b), renewing the equalization coefficient using an error between the determined data and the equalized data, and generating the sampling clock for compensating for the error during a period except the known signal sequence period.

2. The adaptive signal processing method according to claim 1, wherein the known signal sequence is Insert and Track Information (ITI) sector data of the respective tracks.

3. The adaptive signal processing method according to claim 2, wherein in the step (b), the track mode is detected for each track using the ITI sector data and a maximum error of the ITI sector data is considered using a track start signal (TSS) generated from a servo unit.

4. The adaptive signal processing method according to claim 2, wherein in the step (b), the track mode is detected only for an initial operation using the ITI sector data and a maximum error of the ITI sector data is considered using a track start signal (TSS) generated from a servo unit.

5. The adaptive signal processing method according to claim 1, wherein in the step (e), the sampling clock for compensating for the error is generated using a Mueller & Müller algorithm.

6. A method for adaptively processing symbol timing recovery and equalization for an input signal including known signal sequence, the method comprising the steps of:

(a) sampling an input signal according to a sampling clock to generate a sampled data;

(b) determining a level value of the sampled data and outputting first determined data;

(c) detecting whether the sampled data is a known signal sequence and detecting a track mode from the known signal sequence according to a predetermined track pattern;

(d) detecting an error between a prestored reference signal and the sampled data, generating the sampling clock for compensating for the error during a remaining known signal sequence period directly after the track mode is detected, detecting an error between the first determined data and the sampled data, and generating the sampling clock for compensating for an timing phase error during a period except the known signal sequence period;

(e) equalizing the sampled data according to a predetermined equalization coefficient and outputting equalized data;

(f) determining a level value of the equalized data and outputting second determined data; and (g) detecting an error between a prestored reference signal according to the track pattern and the equalized data during the remaining known signal sequence period directly after the track mode is detected, detecting an error between the second determined data and the equalized data, and renewing the equalization coefficient using the error during a period except the known signal sequence period.

7. The adaptive signal processing method according to claim 6, wherein the known signal sequence is Insert and Track Information (ITI) sector data of the respective tracks.

8. The adaptive signal processing method according to claim 7, wherein in the step (c), the track mode is detected for each track using the ITI sector data and a maximum error of the ITI sector data is considered using a track start signal (TSS) generated from a servo unit.

9. The adaptive signal processing method according to claim 7, wherein in the step (c), the track mode is detected only for initial operation using the ITI sector data and a maximum error of the ITI sector data is considered using a track start signal (TSS) generated from a servo unit.

10. The adaptive signal processing method according to claim 6, wherein in the step (d), the sampling clock for compensating for the error is generated using a Mueller & Müller algorithm.

11. The adaptive signal processing method according to claim 6, wherein the equalization coefficient is renewed in a predetermined period delay directly after the track mode is detected in the step (g).

12. A method for adaptively processing symbol timing recovery and equalization for an input signal including known signal sequence, the method comprising the steps of:

(a) sampling an input signal according to a fixed sampling clock to generate sampled data;

(b) interpolating the sampled data by an interpolating clock to generate interpolated data;

(c) determining a level value of the interpolated data and outputting first determined data;

(d) detecting whether the interpolated data is a known signal sequence and detecting a track mode from the detected known signal sequence according to a predetermined track pattern;

(e) detecting an error between a prestored reference signal and the interpolated data during the remaining known signal sequence period directly after the track mode is detected, detecting an error between the first determined data and the interpolated data, and generating the interpolating clock for compensating for an timing phase error during a period except the known signal sequence period;

(f) equalizing the interpolated data according to a predetermined equalization coefficient to generate equalized data;

(g) determining a level value of the equalized data and outputting second determined data; and (h) detecting an error between a prestored reference signal and the equalized data during a remaining known signal sequence period directly after the track mode is detected, detecting an error between the second determined data and the equalized data, and renewing the equalization coefficient using the error during a period except the known signal sequence period.

13. The adaptive signal processing method according to claim 12, wherein the known signal sequence is ITI (Insert and Track Information) sector data of the respective tracks.

14. The adaptive signal processing method according to claim 13, wherein in the step (d), the track mode is detected for each track using the ITI sector data and a maximum error of the ITI sector data is considered using a track start signal (TSS) generated from a servo unit.

15. The adaptive signal processing method according to claim 13, wherein in the step (d), the track mode is detected only for initial operation using the ITI sector data and a maximum error of the ITI sector data is considered using a track start signal (TSS) generated from a servo unit.

16. The adaptive signal processing method according to claim 12, wherein the sampling clock for compensating for the error is generated using a Mueller & Müller algorithm in the step (e).

17. The adaptive signal processing method according to claim 12, wherein the equalization coefficient is renewed in a predetermined period delay directly after the track mode is detected in the step (h).

18. An adaptive signal processing circuit in a digital recording/reproducing apparatus for recovering symbol timing from a signal obtained by equalizing a reproduction signal including known signal sequence, the circuit comprising:
    an analog-to-digital (A/D) converter for sampling the input signal according to a sampling clock to generate sampled data;
    an equalizer for equalizing the sampled data according to a predetermined equalization coefficient to generate equalized data;
    a determiner for determining level values of the equalized data and outputting the determined data;
    a first detector for detecting whether the sampled data is a known signal sequence, detecting a track mode from the detected known signal sequence according to a predetermined track pattern, generating a selection signal and generating and outputting to the equalizer an enable signal enabled directly after the track is detected;
    a generator for generating a reference signal according to the detected track pattern;
    a second detector for detecting the reference signal during a remaining known signal sequence period directly after the track mode is detected according to the selection signal, selecting the determined data during a period except a known signal sequence period, and detecting an error between either of said reference signal or said determined data and the equalized data; and
    a timing detector enabled by the enable signal for generating the sampling clock for compensating for the error, wherein the equalizer renews the equalization coefficient using the error.

19. An adaptive signal processing circuit in a digital recording/reproducing apparatus for recovering symbol timing from a signal obtained by equalizing a reproduction signal including known signal sequence, the circuit comprising:
    an analog-to-digital (A/D) converter for sampling the reproduction signal according to a sampling clock to generate sampled data;
    a first determiner for determining level values of the sampled data and outputting first determined data;
    a detector for detecting whether the sampled data is a known signal sequence, detecting a track mode from the detected known signal sequence according to a predetermined track pattern, and generating a selection signal and an enable signal enabled directly after the track is detected;
    a generator for generating a reference signal according to the detected track pattern;
    a selector for selecting the reference signal during a remaining known signal sequence period directly after the track mode is detected according to the selection signal, selecting the first determined data during a period except a known signal sequence period, and generating a selection signal;
    a timing detector enabled by the enable signal for detecting a timing phase error between the selection signal and the sampled data and generating the sampling clock for compensating for the error;
    an equalizer enabled by the enable signal for equalizing the sampled data according to a predetermined equalization coefficient to generate equalized data;
    a second determiner for determining level values of the equalized data and outputting second determined data; and
    a second detector for selecting the reference signal during the remaining known signal sequence period directly after the track mode is detected according to the selection signal, selecting the second determined data during a period except the known signal sequence period, wherein the equalizer renews the equalization coefficient using the error.

20. The adaptive signal processing circuit according to claim 19, further comprising:
    a first delay for delaying the selection signal for a predetermined period;
    a second delay for delaying the enable signal for the predetermined period and providing the delayed signal to the equalizer; and
    a third delay for delaying the reference signal for the predetermined period and providing the delayed signal to the second detector.

21. An adaptive signal processing circuit in a digital recording/reproducing apparatus for recovering symbol timing from a signal obtained by equalizing a reproduction signal including known signal sequence, the circuit comprising:
    an analog-to-digital (A/D) converter for sampling the reproduction signal according to a fixed sampling clock to generate sampled data;
    an interpolator for interpolating the sampled signal by an interpolating clock to generate interpolated data;
    a first determiner for determining level values of the interpolated data and outputting first determined data;
    a detector for detecting whether the interpolated data is a known signal sequence and detecting a track mode from the known signal sequence according to a predetermined track pattern and generating a selection signal and an enable signal enabled directly after the track mode is detected;
    a generator for generating a reference signal according to the detected track pattern;
    a selector for selecting the reference signal generated during a remaining known signal sequence period directly after the track mode is detected according to the selection signal, selecting the first determined data during a period except a known signal sequence period, and generating a selection signal;

a timing detector enabled by the enable signal for detecting a timing phase error between the selection signal and the sampled data and generating the sampling clock for compensating for the error;

an equalizer enabled by the enable signal for equalizing the sampled data according to a predetermined equalization coefficient to generate equalized data;

a second determiner for determining level values of the second determined data; and a second detector for selecting the reference signal during the remaining known signal sequence period directly after the track mode is detected according to the selection signal, and selecting the second determined data during a period except the known signal sequence period, wherein the equalization coefficient is renewed using the error detected by the second detector.

22. The adaptive signal processing circuit according to claim 21, further comprising:

a first delay for delaying the selection signal for a predetermined period;

a second delay for delaying the enable signal for the predetermined period and providing the delayed signal to the equalizer; and a third delay for delaying the reference signal for the predetermined period and providing the delayed signal to the second detector.

* * * * *